June 19, 1956   F. G. PARIS ET AL   2,750,733
JET PROPULSION ENGINE WITH PULSE JET UNITS
Filed April 21, 1953   2 Sheets-Sheet 1
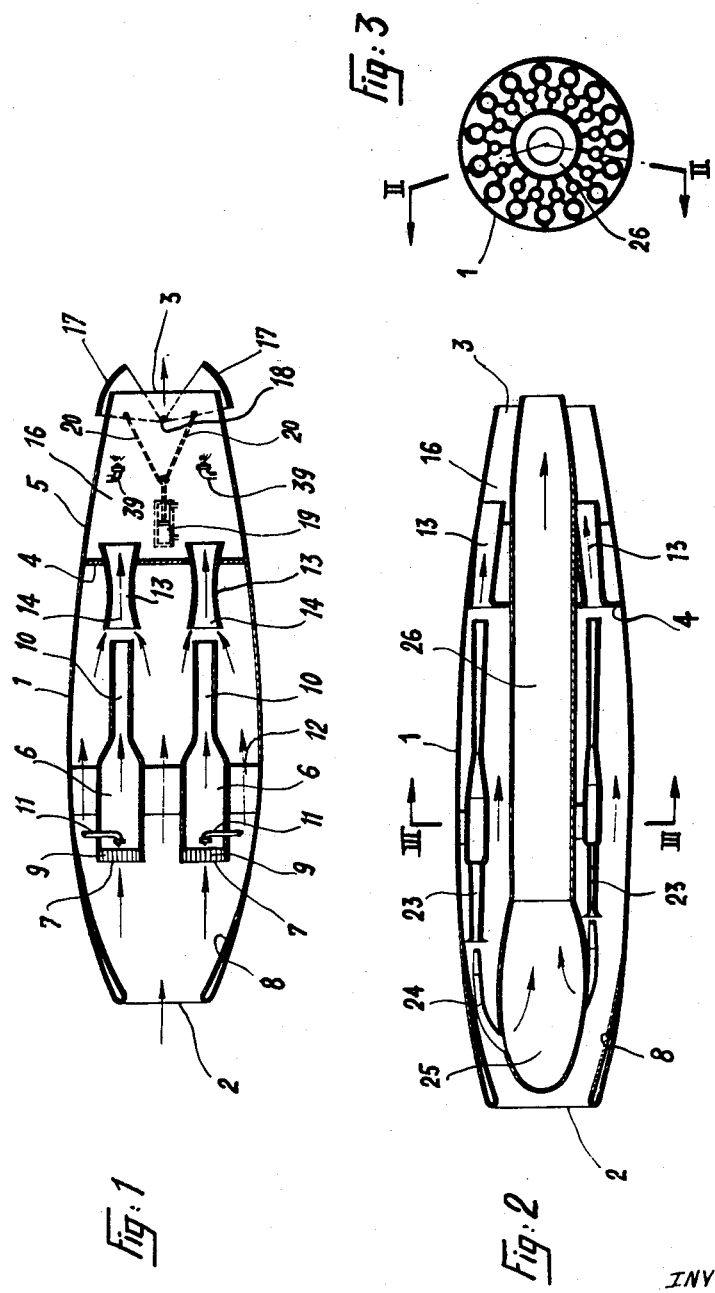

INVENTORS
François G. Paris
Jean Le Foll
Jean H. Bertin
Marcel J. Barant
By Watson, Cole, Grindle & Watson
ATTORNEYS United States Patent Office 2,750,733
Patented June 19, 1956

2,750,733
JET PROPULSION ENGINE WITH PULSE JET UNITS

François G. Paris, Chaville, Jean Le Foll, Le Pre-Saint-Gervais, Jean H. Bertin, Neuilly-sur-Seine, and Marcel J. Baraut, Montgeron, France, assignors to Société Nationale d'Etude et de Construction de Moteurs d'Aviation, Paris, France, a French company Application April 21, 1953, Serial No. 350,072

Claims priority, application France April 24, 1952

7 Claims. (Cl. 60—35.6)

The ram-jet or athodyd is a machine which is not very expensive to build, is free of vibration and very suitable for high flying speeds, but it has the great defect that it does not develop any thrust at low speeds.

The pulse-jet unit is also not very expensive and may be considered as a thermal generator of kinetic energy which is delivered in pulsatory form. This apparatus develops an appreciable thrust from a stationary position; but it gives rise to considerable vibration and its thrust falls away fairly quickly at high speeds, by reason of its pulsatory admission. The kinetic energy which it develops is furthermore not efficiently utilizable because of the pulsatory nature of the exhaust.

In our U. S. patent application Ser. No. 229,946, filed June 5, 1951, for "A Reaction Propulsion Unit," we have described a combination of a ram-jet unit with at least one pulse-jet unit, the pulse-jet unit or units being arranged in the interior of the ram-jet unit in such a way that the air supply of the pulse-jet units is derived from the air of much lower velocity that occurs after the inlet nozzle of the ram-jet unit, the combustion chamber of the pulse-jet unit or units being furthermore located in the central portion of the ram-jet unit, in order to heat the air used in the cycle of the ram-jet unit by that portion of the heat given out from the pulse-jet unit or units which is transmitted through the walls of the combustion chambers of these units.

One of the main objects of the present invention is to convert the pulsatory or discontinuous flow generated by the pulse jet units into a substantially continuous flow issuing from the engine in the form of a propulsive jet.

Another object of this invention is to provide means for augmenting the thrust of the engine while contributing to the conversion of the pulsatory flow into a continuous flow.

A further object of this invention is to ensure an effective cooling of the walls of the pulse jet units at low flying speeds and even when the aircraft is stationary.

A still further object of this invention is to provide means for supplying the pulse jet units with an airstream flowing at a velocity which is not excessive even at very high flying speeds.

Other objects and advantages of the present invention will appear in the following description, given by way of example, with reference to the accompanying drawings in which:

Fig. 1 is a longitudinal section of a first embodiment of the invention.

Fig. 2 is also a longitudinal section of a second embodiment.

Fig. 3 is a cross-section along the line III—III of Fig. 2. In Fig. 3, the broken line II—II indicates the plane of the cross-section of Fig. 2.

Figure 4:
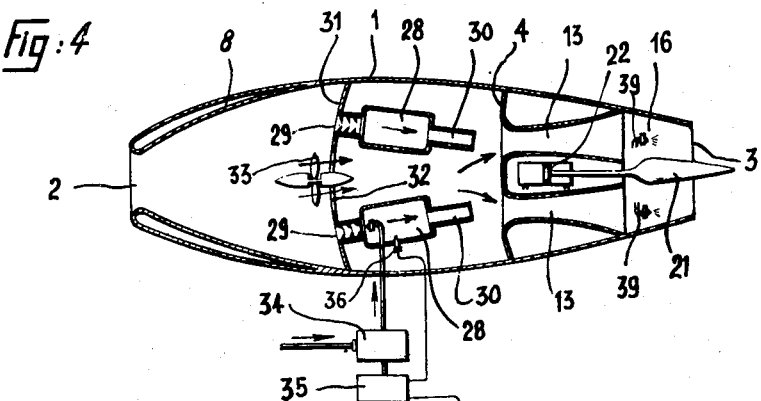
Figure 5:
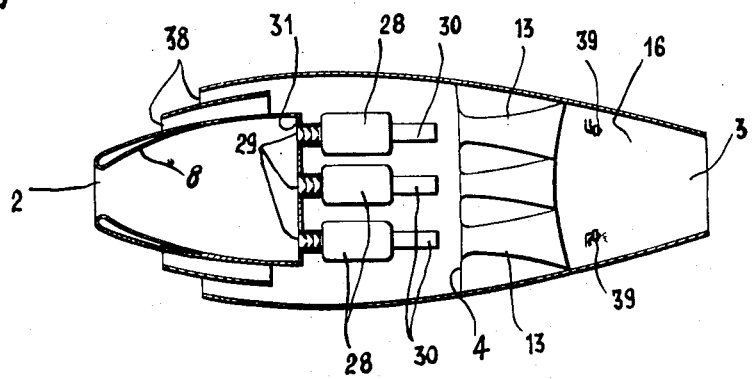

Figs. 4 and 5 show longitudinal sections of two other forms of embodiment making use of pulsatory chambers of the type employing scavenging in accordance with the U. S. patent application Ser. No. 340,832.

Figure 6:
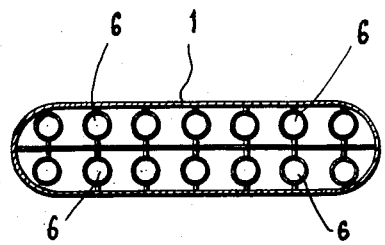

Fig. 6 is a cross section of another alternative showing a flattened form of cowling member suitable for mounting inside a wing.

In the form of embodiment shown in Fig. 1, a cowling body 1 in the form of a ram-jet nacelle, which is supposed in this example to be of circular cross-section, having its air inlet orifice at 2 in the form of a ramming intake and its exhaust orifice at 3 in the form of a propulsive nozzle, is divided into two portions by a fluid-tight partition 4. This partition is located slightly beyond the beginning of the convergent portion 5 which usually forms in the rear portion of a nacelle of this kind. On the intake side of this partition, there are arranged, parallel to the axis of the nacelle, a number of pulse-jet units 6. These pulse-jets have their air inlet orifices 7 opening at the rear of the ramming intake 2, i. e. in a zone of the nacelle wherein the air has been slowed down. There has been shown diagrammatically in the form of a grid 9, the air supply arrangement of each of the pulse-jet units, this arrangement being so disposed as to permit the entry of air to the pulse-jet units between successive explosions, but to oppose the discharge in a forward direction of the gases generated by these explosions. These gases are exhausted to the rear of the pulse-jet units through exhaust pipes 10 which have, as is well known, the two following functions: to transform into kinetic energy the pressure energy of the gases generated from each explosion; and to create in the combustion chambers of the pulse-jets, behind the column of gas ejected, a depression or sub-pressure, which automatically ensures the drawing-in of the successive charge of air by the orifices 7. The devices 9, which have a unidirectional effect, may be either mechanical flap-valves or, preferably, aerodynamic valves, that is to say tubular members having such an outline as to have a much less resistance in the direction of the flow of the air towards the interior of the pulse-jets than in the reverse direction. Such aerodynamic valves have been described for example in the U. S. patent applications Ser. No. 56,582, filed October 26, 1948, now Patent No. 2,670,011, and Ser. No. 229,945, filed June 5, 1951. The pulse-jet units designed in this way operate, as is well known, automatically, and maintain their operation at the frequency of resonance of the sound pipe which they constitute, in such a way that the fuel can be fed in a continuous manner to the burners 11 and that no ignition arrangement is necessary except during starting-up periods.

The pulse-jet units are fixed to the nacelle in any suitable manner, for example by means of flat strut members 12.

The tubular exhaust pipes 10 of the pulse-jet units discharge into ejector devices 13 which extend across the partition 4 and constitute the only passages through this partition.

Between the pulses of the exhaust, these ejectors are filled with the air which, entering through the orifice 2, passes between the pulse-jet units and absorbs the heat evolved through the walls of these pulse-jets. The air which is thus sucked up by the ejectors between successive puffs is discharged together with these puffs into a pressure chamber 16 ending with the propulsive nozzle 3 and otherwise closed. Therefore the ejector units form compressors, so that by varying the area of the nozzle 3, there can be obtained a certain level of pressure in this chamber and a flow forming an almost continuous reaction jet through this nozzle 3. There is thus finally obtained a thrust which is better than that which would be obtained from the pulse-jet units if they were alone, particularly at high speeds of flight.

In addition, as we have explained in our U. S. patent application Serial No. 229,947, filed June 5, 1951, the ejector units produce an increase in the thrust, due to the exchange in momentum of the air sucked up and set in motion by these units, with the motive gaseous puffs.

The obtaining of a continuous flow of the jet is assisted by an increase in the number of pulse-jet units, since experience has shown that these units, grouped close to each other within a same enclosure automatically adjust their cycle so as to operate in out-of-phase relation with each other. In this way, the ejector units discharge successively into the pressure chamber 16. In a similar way, the pulse-jet units successively draw in air from the ramming intake portion of the nacelle. From this it results that the continuous flow of atmospheric air into the said intake portion is judiciously combined with the pulsatory flow through the pulse-jet units, the ejectors restoring the continuity of the flow towards the rear. Thus two cycles become combined, one of which is the high pressure cycle of the pulse-jet unit, and the other being the low pressure cycle of a ram-jet unit.

In the same way as the ram-jet alone, the combined apparatus lends itself to very high speeds of flight, but it offers a great advantage over the ram-jet in that it gives a considerable thrust when stationary and at low speeds. In addition, the noise of the pulse-jet units is damped by the chamber 16 which forms a kind of silencer and the vibration caused by the pulse-jet units can be eliminated by incorporating elastic members in the mountings of these pulse-jets in the interior of the nacelle 1.

It should furthermore be noted that, when stationary, the exhaust of the pulse jet units creates, by virtue of the ejectors, an active circulation of air around the pulse-jets and, in consequence, permits them to be cooled while stationary.

The area of the nozzle 3 is very important when it is desired to obtain a continuous-flow jet, a reduction of the cross-section of this orifice being favourable to this continuous-flow condition. It will therefore be an advantage to provide the said orifice with a control arrangement which may be of any known type whatever, of the needle type or movable cone, pivoted shutters, etc . . . or to combine it with an after-burning or exhaust reheat arrangement as will be explained below.

There has been shown very diagrammatically in Fig. 1, a known control arrangement which consists of two shutters 17, the shape of which is adapted to the shape of the rear portion of the cowling and which can be caused to pivot about an axis 18 by any appropriate means such as a hydraulic jack 19, the piston of which is connected by crank-arms 20 to the said shutters.

In Fig. 4, there has been shown a control arrangement constituted by a needle 21 which may be moved along the axis of the cowling by means of a hydraulic jack 22.

It is desirable that each of the ejector units 13 should have an internal volume at least equal to the volume of air drawn in with each pulse of the exhaust of the corresponding pulse-jet unit. As regards the upper limit of this internal volume, this will depend on the desired ratio of compression in the pressure chamber 16. The length of the ejector units and, in consequence, their volume, will increase in proportion as the ratio of compression increases, it being noted, on the contrary, that the efficiency of ejector units falls, as their length increases. In practice, the internal volume of the ejectors will amount to between 100% and 200% of the volume of air drawn in at each explosion. On the other hand, the ejectors will be adapted to prevent a back-flow of the gases from the chamber 16 between two pulsations. This means that the ejectors must also be given a length which increases as the pressure maintained in the chamber 16 rises, in such a way as to prevent the beginning of a back-flow of the gases, by means of the kinetic energy of the column of gas which is still moving inside the ejector towards the chamber.

In the alternative embodiment of Figs. 2 and 3, the pulse jet-units are provided with an aerodynamic valve formed by a convergent-divergent tubular member 23 of the kind described in the U. S. patent application Ser. No. 229,945 previously referred to. The inevitable losses from such aerodynamic valves during explosions are collected by tubes 24 and led towards an axial gas recovery chamber 25, common to all the pulse-jets, which delivers toward the rear of the nacelle 1 through a tube 26, thus giving an almost continuous jet, in accordance with the arrangement described in U. S. patent application Ser. No. 340,833, filed March 6, 1953. The number of pulse-jet units is high and these units are arranged in two concentric rings (see Fig. 3), so as to use to best effect the internal volume of the nacelle 1.

The exhaust orifice 3 of the chamber 16 into which the ejectors 13 discharge, while being supplied by the exhaust from the pulse-jets, is an annular orifice located around the outlet of the tubular member 26 of the common recovery chamber 25.

A control arrangement similar to that of Fig. 1 may be combined with this annular orifice 3 in order to vary its area.

In the alternative embodiment shown in Fig. 4, the standard self-feeding pulse-jet units are replaced by pulsatory chambers with short exhaust tubes and employing a scavenging system for feeding, of the type described in the U. S. patent application Ser. No. 340,832 referred to above.

A number of these chambers 28, each of which comprises an air inlet device 29, which is supposed to be constituted by an aerodynamic valve with dished rings and a short exhaust pipe 30, are arranged inside the cowling member 1.

A partition 31 is arranged in the nacelle 1 and the air inlet devices 29 open on the intake side of this partition. The air which does not supply the chambers 28 cannot pass to the delivery side of this partition otherwise than through a hole 32 provided in order to create a loss of pressure equal to the scavenging pressure. The loss of pressure may be obtained by causing the air passing through the hole 32 to operate a small screw or turbine 33, the energy of which is used to produce electricity or to operate the auxiliary apparatus.

The tubular exhaust pipes 30 discharge into the ejectors 13. The latter discharge the air coming from the orifice 32 into the rear chamber 16, which is provided with an outlet orifice 3, the area of which may be regulated.

As the short scavenging chambers 28 may not be of the resonant type, they are provided in this case with a fuel-injection arrangement such as a pump 34 and a spark plug 36 supplied from an electric generator 35, the pump and the generator being driven at a desired frequency by a motor 37, the speed of which may be regulated in order to vary the frequency of operation of the chambers. This control is accompanied with advantage by a control of the area of the outlet orifice 3 by means of a moving needle 21 or similar device.

Fig. 5 shows an alternative arrangement to that of Fig. 4, in which the whole of the air entering through the orifice 2 supplies the scavenging pulsatory chambers 28, while dilution air heated through contact with the walls of the chambers 28 and mixing with the exhaust gas thereof, and which should have a lower pressure in order to allow scavenging of the chambers 28, is taken from the boundary layers which have much lower speeds, by means of one or more annular orifices 38.

It should be noted that the combined arrangement which forms the subject of the invention is well adapted for the application of after-burning or exhaust reheat inside the chamber 16 into which the ejectors discharge, in order momentarily to increase the thrust. In actual fact, the mixture discharged by the ejector units into this chamber is rich enough in oxygen to allow the combustion of fuel injected at any desired moment through burners 39 arranged inside the said chamber.

By virtue of the turbulence maintained by the discharge of the ejectors into the chamber 16, it is easy to effect the after-burning by dispensing with the devices normally provided to effect turbulence artificially. The after-burning may thus be effected without causing losses of pressure.

It should furthermore be observed that in Figs. 4 and 5, the partition 4 is smoothly connected without any sharp angle to the walls of the ejectors, which latter are also joined without any angular projection to the chamber 16. The efficiency may thus be improved by reducing the losses. However, the discharge of the ejector units 13 with an angular projection such as is shown in Figs. 1 and 2 can have a favourable effect on the after-burning in the chamber 16.

In the alternative embodiment of Fig. 6, the nacelle 1, shown in cross-section, is of flattened shape which permits the combined propulsion unit to be housed inside a wing and to cause the jet to discharge through a similarly flattened orifice along the trailing edge of the wing, which is an advantage from the aerodynamic point of view.

What we claim is:

1. A jet propulsion engine comprising a front compartment having a frontal air-intake passage, a rear compartment having a rear gas-exhaust passage, a partition between said compartments separating one from the other, an intermittent-firing combustion chamber having an exhaust pipe designed for forming a gaseous jet, said chamber extending inside said front compartment, and an ejector cooperating with said pipe and energized by said jet, said ejector being disposed through said partition thereby connecting said front compartment with said rear compartment.

2. A jet propulsion engine as recited in claim 1, wherein the frontal air-intake passage is in the form of a diffuser to assist in the conversion of the velocity of the air into pressure, the combustion chamber having an air inlet opening in a part of the front compartment in the vicinity of the pressure end of said diffuser, and wherein the rear gas-exhaust passage is in the form of a propelling nozzle to assist in the conversion of the pressure of the gas into velocity.

3. A jet propulsion engine as recited in claim 2, wherein the compartments are bounded by a casing in the shape of a ram jet duct.

4. A jet propulsion engine as recited in claim 2, wherein the rear gas-exhaust passage is a variable-area propelling nozzle.

5. A jet propulsion engine as recited in claim 2, further comprising exhaust reheat means in the rear compartment.

6. A jet propulsion engine as recited in claim 2, comprising a plurality of intermittent-firing combustion chambers and ejectors associated with each other, said chambers and ejectors sucking up air from the front compartment, and said ejectors discharging into the rear compartment.

7. A jet propulsion engine having at least one pulse jet unit provided with an exhaust pipe extending generally towards the rear of the engine, said engine comprising an ejector device having a forwardly facing inlet spaced from and in the vicinity of the end of said exhaust pipe and a rearwardly facing outlet, and a rearwardly extending pressure chamber communicating, towards the rear thereof, with the atmosphere and, towards the front thereof, with said ejector device through said outlet, said pressure chamber being otherwise substantially closed.

References Cited in the file of this patent

UNITED STATES PATENTS

| | | |
|---|---|---|
| 2,546,966 | Bodine | Apr. 3, 1951 |
| 2,612,748 | Tenney et al. | Oct. 7, 1952 |
| 2,613,496 | Kollsman | Oct. 14, 1952 |
| 2,635,421 | Blum | Apr. 21, 1953 |
| 2,639,580 | Stuart | May 26, 1953 |
| 2,670,597 | Villemejane | Mar. 2, 1954 |